United States Patent [19]
Woerman et al.

[11] 3,747,688
[45] July 24, 1973

[54] COMBINATION CULTIVATOR, ROLLER AND LEVELING BAR

[76] Inventors: Delwin G. Woerman, 420 Filmore St., Caldwell, Idaho 83605; David G. Johnson, Rt. 3 Franklin Rd., Nampa, Idaho 83651; Donald F. Murphy, 609 W. Hazel, Caldwell, Idaho 83605

[22] Filed: Nov. 10, 1971

[21] Appl. No.: 198,031

[52] U.S. Cl. ............................ 172/149, 172/661
[51] Int. Cl. .................................... A01b 5/00
[58] Field of Search .................. 172/142–143, 145–147, 149, 153, 170, 173–177, 197, 199

[56] References Cited
UNITED STATES PATENTS
| | | | |
|---|---|---|---|
| 3,006,422 | 10/1961 | Mighell | 172/142 |
| 3,448,814 | 6/1969 | Bentley et al. | 172/146 |
| 2,925,870 | 2/1960 | Michelsen et al. | 172/146 |
| 3,225,839 | 12/1965 | Petitt | 172/142 X |

*Primary Examiner*—Robert E. Pulfrey
*Assistant Examiner*—R. T. Rader
*Attorney*—John W. Kraft

[57] ABSTRACT

The combination cultivator, roller or pulverizer, and leveling bar of this invention comprises a substantially rectangular solid frame; a cultivator assembly including a multiplicity of teeth disposed distally at intervals into transverse ranks in the frame, a roller or pulverizer assembly disposed distally rearwardly on the frame, being carried on the frame by a pair of support arms disposed on the outermost terminal side of the frame, and comprising a multiplicity of spur gear-like wheels disposed on an axle which is coextensive in width with the frame; and a leveling bar assembly disposed between the frame and the roller or pulverizer assembly including a bar coextensive in width with the frame and pivotally carried at each of its terminal ends by a pair of support arms which are pivotally mounted on the frame, and a actuator means operable to selectively raise and lower the leveling bar.

2 Claims, 5 Drawing Figures

3,747,688

DELWIN G. WOERMAN
DAVID G. JOHNSON     INVENTOR.
DONALD F. MURPHY

PATENTED JUL 24 1973 3,747,688

DELWIN G. WOERMAN
DAVID G. JOHNSON   INVENTOR.
DONALD F. MURPHY

COMBINATION CULTIVATOR, ROLLER AND LEVELING BAR

FIELD OF INVENTION

The present invention relates to soil cultivators and more particularly to soil cultivators provided with leveling bar means, clod pulverizer means, and compactor means.

DESCRIPTION OF THE PRIOR ART

Cultivators, pulverizers, and leveling planes have been commonly used and employed in soil tillage as separate apparatus and as separate steps in the soil preparation process. The presence of separate tilling steps in cultivating, pulverizing, and land planing or leveling makes soil preparation a relatively extensive activity. Efforts have been made to combine certain steps of cultivating and rolling or pulverizing. The specific relationship between the tillage activities of cultivating, pulverizing, compacting, and land planing or leveling are important. Simple combination of cultivating and rolling or pulverizing tends to leave air pockets and chimneys in the tilled soil, which result in wind eroding and other types of erosion.

Accordingly, it is an object of the present invention to provide cultivating, land planing or leveling, rolling or pulverizing, and compacting steps in a specific relationship.

It is another object of this invention to selectively control the depth of the land planing or leveling bar.

It is a further object of this invention to provide rolling or pulverizing and compacting means in a combination cultivator, roller or pulverizer, and leveling bar which may be provided with means to roll or pulverize and compact at a predetermined compaction rate.

These and other objects shall become apparent from the description following, it being understood that modifications may be made without affecting the teachings of the invention here set out.

SUMMARY OF THE INVENTION

Generally, the combination cultivator, roller or pulverizer, and leveling bar of this invention comprises a substantially rectangular solid frame; a cultivator assembly including a multiplicity of teeth disposed distally at intervals into transverse ranks in the frame; a roller or pulverizer assembly disposed distally rearwardly on the frame, being carried on the frame by a pair of support arms disposed on the outermost terminal side of the frame, and comprising a multiplicity of spur gear-like wheels disposed on an axle which is coextensive in width with the frame; and a leveling bar assembly disposed between the frame and the roller or pulverizer assembly including a bar coextensive in width with the frame and pivotally carried at each of its terminal ends by a pair of support arms which are pivotally mounted on the frame, and an actuator means operable to selectively raise and lower the leveling bar.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
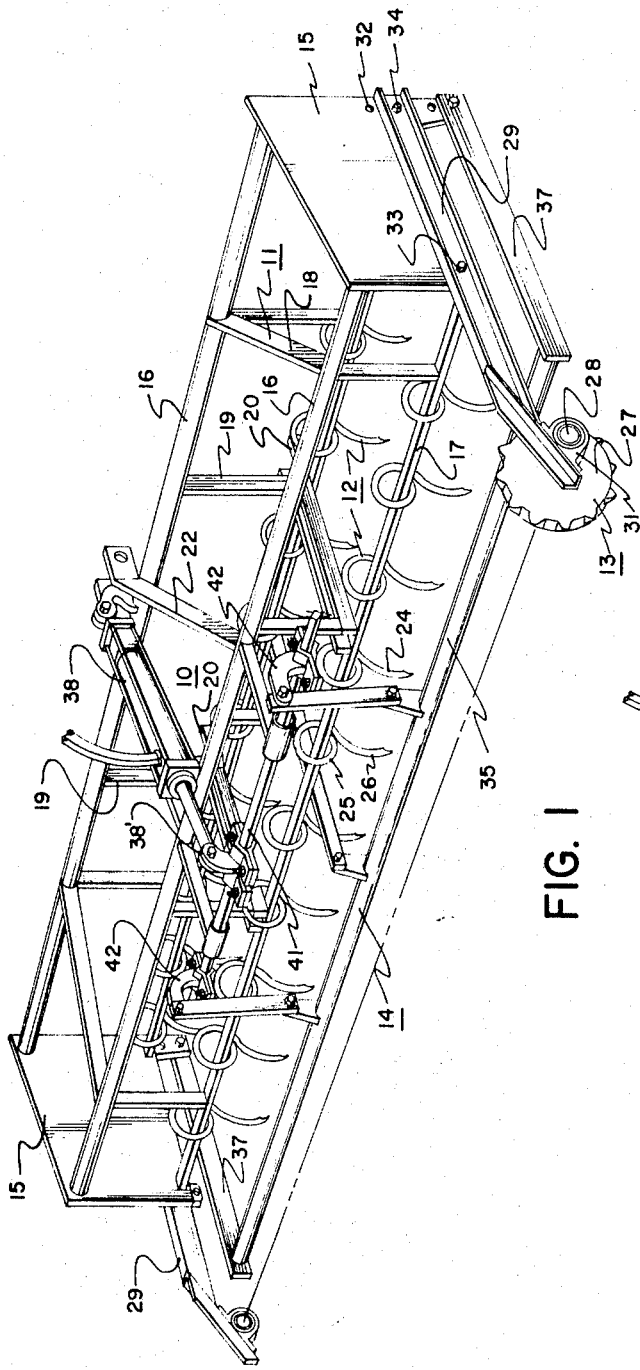
FIG. 1 is a right rear perspective view of the combination cultivator, roller and leveling bar of this invention.

Referring now to the drawings and more particularly to the FIG. 1, the combination cultivator, roller and leveling bar of the present invention is shown to advantage and identified by the numeral 10. The combination cultivator, roller and leveling bar 10 generally comprises a combination frame 11, a cultivator assembly 12, a roller assembly 13, and a leveling bar assembly 14. The combination frame 11 comprises a pair of substantially trapezium-shaped sidewall plates 15 disposed at each of the terminal sides of the combination 10, a pair of upper-support bars 16, and a plurality of lower-support bars 17. The trapezuim-shaped sidewall plates 15 are disposed at the terminal sides of the combination 10 such that the narrowest end is disposed upwardly and the widest terminal side is disposed at the forwardmost end of the combination 10. The trapezuim-shaped sidewalls 15 are of a suitable thickness to carry the combination 10 and to reinforce it from stressess resulting from operation. The pair of upper bars 16 are provided at the uppermost corners of the sidewall plates 15. The upper bars 16 are joined to the upper interior terminal corners of the shaped sidewall plates 15 at their terminal ends, and are coextensive in width with the combination 10. The bars 16 are intended as the main frame members supporting the combination 10. The plurality of bars 17 are disposed at the lowermost interior terminal end of the sidewall plates 15, and are coextensive in length with the bars 16. The frame 11 is provided with stiffening means, such as diagonals 18, disposed between the upper bars 16 and the lower bars 17. Sag ties 19 are disposed vertically between bars 16 and 17 to provide a reinforcing connection between the bars 16 and 17. It is to be understood that the frame 11 is a substantially rectangular trapezium solid. The combination cultivator, roller and leveling bar 10 of the preferred embodiment is intended to be dependingly carried by a commonly known three-point hitch 20 of a tractor 21, as shown more clearly by the FIG. 4. A joining bracket 22 is provided on the combination 10 as a pair of rigidly-fastened, centrally-disposed diagonals disposed between the bars 16 and a pair of diagonals 18, as shown by the FIGS. 1 and 5.

Referring again to the FIG. 1, the cultivator assembly 12 comprises a multiplicity of cultivator teeth 24 disposed distally at intervals in ranks on the lower bars 17. Each of the cultivator teeth 24 comprises a spiraling curved portion 25 fastened at one of its terminal ends to the lowermost terminal edge of the bar 17, looping around the bar 17, and having a curved bend 26 at its lower portion disposed with the concave side of the curve disposed forwardly with respect to the combination 10. The teeth 24 are operable to dig into the soil being cultivated and to release if a tooth 24 strikes a large solid object, such as a rock or stump.

Figure 4:
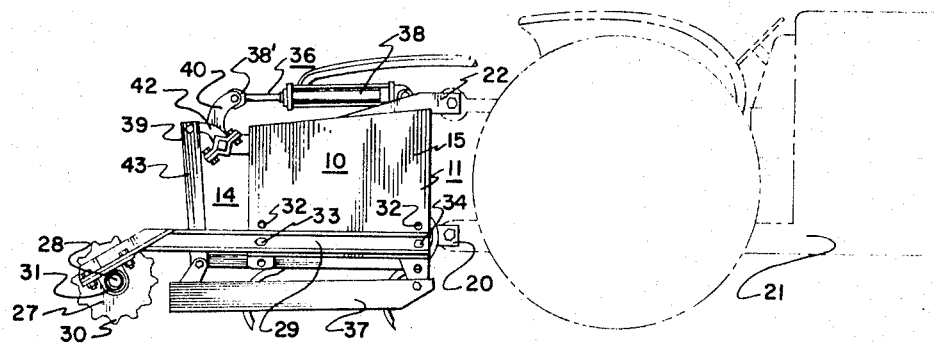
FIG. 4 is a right side elevational view of the cultivator, roller and leveling bar of this invention, shown mounted on a tractor in broken lines for illustrative purposes.
Figure 5:
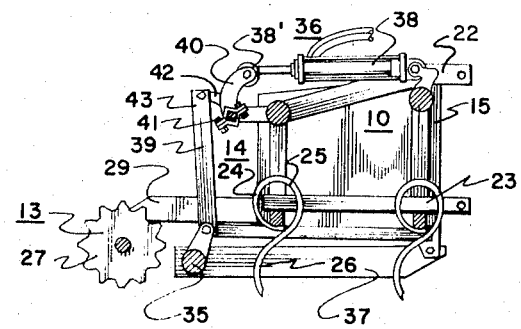
FIG. 5 is a cross sectional view of the cultivator, roller and leveling bar of this invention taken substantially along the lines 5—5 of the FIG. 3 showing the interior configuration of this invention.

Referring now to the FIGS. 1 and 4 the roller assembly 13 is dependingly carried distally rearwardly of the frame 11. The roller assembly 13, hereinafter called pulverizer 13, is operable to pulverize soil clods and to lightly compact the cultivated soil. The pulverizer 13 comprises a multiplicity of toothed wheels 27 disposed in a rank on a common axle 28 for rotation. The axle 28 is carried by a pair of supporting arms 29 connected to the frame 11. The wheels 27 are provided with a multiplicity of spur gear-like teeth 30 operable to break clods in response to rotation of wheel 27 set in motion by the travel of the combination 10. The axle 28 is coextensive in width with the combination 10. The supporting arms 29 are a pair of substantially horizontally disposed bars fastened to the outermost terminal side of the sidewalls 15. The axle 28 may be joined for rotation on the supporting arms 29 by means of pillow-block bushings 31 disposed on the rearwardmost terminal end of the arms 29. The force of compaction of the pulverizer 13 may be selectively controlled by adjusting the angle of the supporting arms 29 with respect to the frame 11. Generally, the lower the pulverizer wheels 27 are with respect to the frame 11, the more compaction will result. Adjusting means may be a plurality of suitably disposed holes 32 provided in the trapezium-shaped sidewalls 15. In this preferred embodiment, a fulcrum-like adjusting means has been employed with a pivot bolt 33 disposed on the rearwardmost side of the sidewalls 15 and with a plurality of suitably disposed holes 32 at the forwardmost end of the sidewalls 15. The wheels 27 may be lowered by fastening a bolt 34 through successively higher holes of the rearwardmost terminal end of the sidewalls 15.

Referring again to the FIGS. 1, 4 and 5, the leveling bar 14 is disposed between the pulverizer 13 and the frame 11. The leveling bar assembly 14 comprises a leveling bar 35 and a depth actuator 36. The bar 35 is coextensive in width with the frame 11. The bar 35 is carried on a pair of supporting arms 37 which connect the respective terminal ends of the bar 35 and the outermost terminal sides of the forwardmost lower terminal ends of the sidewalls 15. That is, the bar 35 is pivotally carried by a pair of supporting arms 37 which have their point of pivot at the lowermost forward corner of the sidewall plates 15.

The leveling bar assembly 14 may be selectively controlled as to its depth in the ground with respect to the frame 11 by the depth actuator 36. The depth actuator 36 comprises a pressure cylinder 38 and an actuator frame 39. As shown by the FIG. 5, the cylinder 38 is a double acting hydraulic cylinder pivotally mounted at its base to the forwardmost upper bar 16 and with its piston head 38' pivotally mounted to the actuator frame 39. The frame 39 comprises an upwardly projecting curved cam 40 pivotally mounted to the terminal end of the piston head 38' of the cylinder 38 and fixedly mounted to a transversely disposed shaft 41. The shaft 41 journaled for rotation in the frame 39 is provided with a fixedly mounted pair of rearwardly projecting cams 42 and with linking arms 43 pivotally connecting the cams 42 and the bar 35. In operation, the piston head 38' is forced out of the cylinder 38 resulting in rotation of the journaled shaft 41, downward displacement of the linking arms 43, and downward displacement of the leveling bar 35. It is to be understood that, in motion, the leveling bar 35 will tend to be drawn into the soil. To withdraw the bar 35, the piston 38' is withdrawn into the cylinder 38 resulting in a opposite rotation of the journaled shaft 41 and upwardly vertical displacement of the arms 43. It is to be understood that the cylinder 38 in this preferred embodiment has as its source of pressure a suitable source, such as the hydraulic system provided on the tractor 21.

Figure 2:
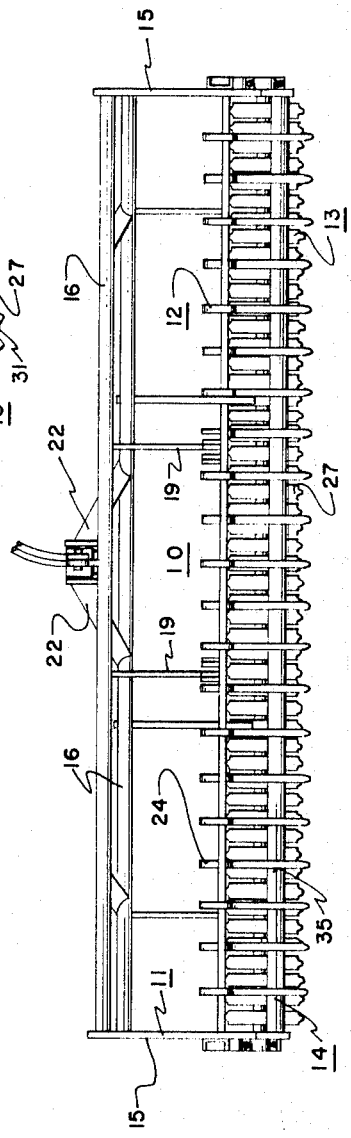
FIG. 2 is a front elevational view of the apparatus of the FIG. 1.
Figure 3:
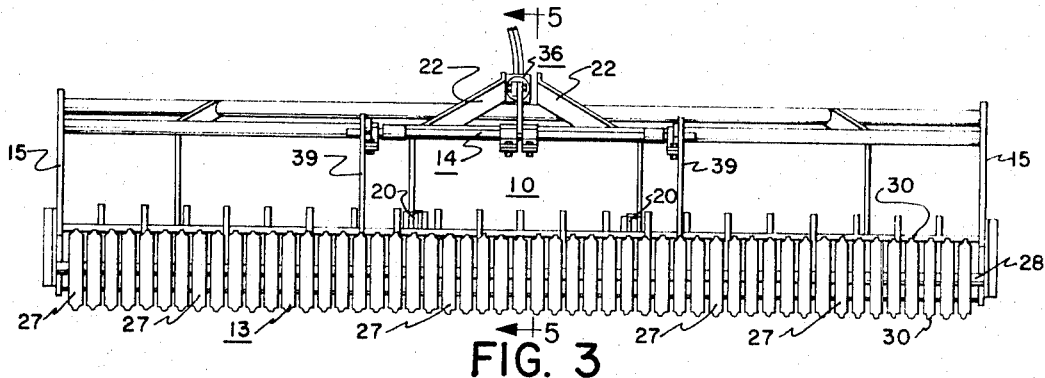
FIG. 3 is a rear elevational view of the apparatus of FIG. 1.

Referring now to the FIGS. 1, 2 and 3, in operation of the combination 10, soil is broken by the forward travel of the cultivator 12 in the frame 11. Soil is caused by the motion of the combination 10 to pass over the leveling bar assembly 14 causing the soil to be leveled and the air pockets and chimneys in the freshly broken soil to be broken, resulting in a uniform mass of soil. The pulverizer 13 then passes over the soil causing clods to be broken and the soil to be lightly compacted by a predetermined amount.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A combination cultivator, roller and leveling bar, comprising a frame including a pair of substantially trapezuim-shaped sidewalls, a pair of upper-support bars coextensive in length with said combination disposed transversely between the uppermost terminal interior corners of said sidewall plates, a plurality of transversely disposed lower-support bars coextensive in length with said upper-support bars disposed at the lowermost terminal edge of said sidewall plates;

a cultivator assembly comprising a multiplicity of cultivator harrow teeth disposed distally at intervals into ranks on said lower-support bars;

a pulverizer assembly disposed distally rearwardly of said frame, said pulverizer assembly being carried on said frame by a pair of support arms disposed on the outermost terminal side of said sidewall plates, said pulverizer assembly comprising a multiplicity of spur gear-like wheels disposed on an axle being coextensive in width with said frame; and a leveling bar assembly disposed between said frame and said pulverizer including a bar coextensive in length with said frame pivotally carried at each terminal end by a pair of support arms, said support arms being pivotally mounted at their forwardmost terminal ends to the forwardmost terminal end of said sidewall plate, and an actuator means operable to selectively raise and lower said leveling bar.

2. The apparatus of claim 1 wherein said actuator means comprises a horizontally disposed double-acting hydraulic cylinder pivotally mounted at its base to the forwardmost said upper-support bar; and an actuator frame including an upwardly projecting curved cam-like arm pivotally mounted to the terminal end of said cylinder and fixedly mounted to a transversely disposed shaft, said shaft journaled for rotation on said combination frame and provided with a pair of fixedly mounted rearwardly projecting members, and a pair of vertically disposed linking arms pivotally connecting said fixedly mounted members and said leveling bar.

* * * * *